(12) United States Patent
Badding et al.

(10) Patent No.: US 10,593,998 B2
(45) Date of Patent: Mar. 17, 2020

(54) PHOSPHATE-GARNET SOLID ELECTROLYTE STRUCTURE

(71) Applicant: Corning Incorporated, Corning, NY (US)

(72) Inventors: Michael Edward Badding, Campbell, NY (US); Paul Oakley Johnson, Corning, NY (US); Xinyuan Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 872 days.

(21) Appl. No.: 14/934,315

(22) Filed: Nov. 6, 2015

(65) Prior Publication Data

US 2016/0149267 A1    May 26, 2016

Related U.S. Application Data

(60) Provisional application No. 62/085,000, filed on Nov. 26, 2014.

(51) Int. Cl.
*H01M 10/00* (2006.01)
*H01M 10/36* (2010.01)
(Continued)

(52) U.S. Cl.
CPC ........... *H01M 10/36* (2013.01); *H01M 4/382* (2013.01); *H01M 4/405* (2013.01);
(Continued)

(58) Field of Classification Search
CPC ............... H01M 10/36; H01M 10/052; H01M 10/0585; H01M 4/382; H01M 10/056;
(Continued)

(56) References Cited

U.S. PATENT DOCUMENTS

| 7,901,658 B2 | 3/2011 | Weppner |
| 8,828,574 B2 | 9/2014 | Visco et al. |

(Continued)

FOREIGN PATENT DOCUMENTS

| JP | 2015176857 A | * 10/2015 | |
| WO | WO-2013161310 A1 | * 10/2013 | ............ H01M 4/13 |
| WO | 2014176266 | 10/2014 | |

OTHER PUBLICATIONS

Machine translation of JP 6081400, obtained Jun. 13, 2018 (Year: 2015).*

(Continued)

*Primary Examiner* — Nicholas P D'Aniello

(57) ABSTRACT

A composite electrolyte tri-layer structure, including a first layer having a first ceramic electrolyte, where the first electrolyte is stable against contact with lithium metal, a second layer having a second ceramic electrolyte, where the second electrolyte is stable against aqueous contact, and a third layer having a third non-aqueous electrolyte interposed between the first layer and second layer, wherein the first electrolyte, the second electrolyte, and the third electrolyte each have a different relative chemical stability. Also disclosed is a method of making and using the tri-layer structure, and an energy storage article or device incorporating at least one of the tri-layer structures.

19 Claims, 2 Drawing Sheets

(51) Int. Cl.
  *H01M 4/40* (2006.01)
  *H01M 10/052* (2010.01)
  *H01M 10/0585* (2010.01)
  *H01M 10/056* (2010.01)
  *H01M 4/38* (2006.01)
  *H01M 4/02* (2006.01)
  *H01M 4/505* (2010.01)

(52) U.S. Cl.
  CPC ....... *H01M 10/052* (2013.01); *H01M 10/056* (2013.01); *H01M 10/0585* (2013.01); *H01M 4/505* (2013.01); *H01M 2004/027* (2013.01); *H01M 2300/0002* (2013.01); *H01M 2300/0025* (2013.01); *H01M 2300/0037* (2013.01); *H01M 2300/0068* (2013.01); *H01M 2300/0071* (2013.01); *H01M 2300/0094* (2013.01)

(58) Field of Classification Search
  CPC ................. H01M 4/405; H01M 4/505; H01M 2300/0068; H01M 2300/0025; H01M 2004/027; H01M 2300/0071; H01M 2300/0037; H01M 2300/0094; H01M 2300/0002
  See application file for complete search history.

(56) References Cited

U.S. PATENT DOCUMENTS

| | | | |
|---|---|---|---|
| 8,828,580 B2 | 9/2014 | Visco et al. | |
| 2005/0019666 A1 | 1/2005 | Yasuda | |
| 2007/0015061 A1* | 1/2007 | Klaassen | H01M 4/13 429/322 |
| 2010/0104934 A1* | 4/2010 | Visco | H01M 6/04 429/105 |
| 2011/0223487 A1* | 9/2011 | Johnson | H01M 4/0471 429/319 |
| 2015/0111110 A1* | 4/2015 | Watanabe | H01M 4/13 429/304 |

OTHER PUBLICATIONS

Yu Yang Hou et al: "Macroporous Li FeP04 as a cathode for an aqueous rechargeable lithium battery of high energy density", Journal of Materials Chemistry A.; Materials for Energy and Sustainability, vol. I, No. 46, 2013, pp. 14713-14718.

International Search Report, issued in connection with corresponding PCT application No. PCT/US2015/061796, dated Apr. 13, 2016.

Jin anf McGinn, "Bulk solid state rechargable lithium ion battery fabrication with Al-doped $Li_7La_3Zr_2O_{12}$ electrolyte and $Cu0.1V_2O_5$ cathode", Electrochimica Acta, 89 (2013), pp. 407-412.

Xu, et. al., "Lithium metal anodes for rechargable batteries" Energy & Environmental Science, 7 (2014), pp. 513-537.

Knauth, "Inorganic solid Li ion conductors: An overview", Solid State Ionics 180 (2009) 911-916.

Cheng et al., "The origin of high electrolyte—electrode interfacial resistances in lithium cells containing garnet type solid electrolytes": Phys. Chem. Chem. Phys., 2014, 16, 18294-18300.

Boulant et al., "Reaction mechanisms of $Li0.30La0.57TiO_3$ powder with ambient air: H+/Li+ exchange with water and $Li_2CO_3$ formation", Dalton Trans., 2010, 39, 3968-3975.

Jaunsen, "The Behavior and Capabilities of Lithium Hydroxide Carbon Dioxide Scrubbers in a Deep Sea Environment", US Naval Academy Technical Report USNA-TSPR-157, 1989.

Ma et al., "Excellent Stability of a Lithium-Ion-Conducting Solid Electrolyte upon Reversible Li+/H+ Exchange in Aqueous Solutions", Angew. Chem. Int. Ed., 2014, 53, 1-6.

Visco et al., "Lithium-Air", Encyclopedia of electrochemical power sources, Secondary Batteries—Metal-Air Systems | Lithium-Air, 2009, pp. 376-384.

Hartmann et al., "Degradation of NASICON-Type Materials in Contact with Lithium Metal; Formation of Mixed Conducting Interphases (MCI) on Solid Electrolytes", J. Phys. Chem. C, 2013, 117, 21064-21074.

Katoh et al., "Lithium/water battery with lithium on conducting glass-ceramics electrolyte", Journal of Power Sources, 196, (2011), 6877- 6880.

Hou et al., Macroporous $LiFePO_4$ as a cathode for an aqueous rechargeable lithium battery of high energy density, J. Mater. Chem. A, 2013, 1, 14713-14718.

Galven et al., "Instability of Lithium Garnets against Moisture. Structural Characterization and Dynamics of $Li_{7-x}H_xLa_3Sn_2O_{12}$ and $Li_{5-x}H_xLa_3Nb_2O_{12}$", Chem. Mater. 2012, 24, 3335-3345.

Jin et al., "$Li_7La_3Zr_2O_{12}$ electrolyte stability in air and fabrication of a $Li/Li_7La_3Zr_2O_{12}/Cu0.1V_2O_5$ solid-state battery", Journal of Power Sources, 239, (2013), 326-331.

Reinacher et al., "Preparation and electrical properties of garnet-type $Li_6BaLa_2Ta_2O_{12}$ lithium solid electrolyte thin films prepared by pulsed laser deposition", Solid State Ionics, 258, (2014),1-7.

* cited by examiner

PHOSPHATE-GARNET SOLID ELECTROLYTE STRUCTURE

This application claims the benefit of priority under 35 U.S.C. § 119 of U.S. Provisional Application Ser. No. 62/085,000 filed on Nov. 26, 2014 the content of which is relied upon and incorporated herein by reference in its entirety.

The entire disclosure of each publication or patent document mentioned herein is incorporated by reference.

BACKGROUND

The disclosure relates to a phosphate-garnet solid electrolyte structure and to methods of making the structure and using the structure in energy storage devices.

SUMMARY

In embodiments, the disclosure provides a phosphate-garnet solid electrolyte structure and to methods of making the structure and using the structure, for example, in an energy storage device.

BRIEF DESCRIPTION OF DRAWINGS

In embodiments of the disclosure.

DETAILED DESCRIPTION

Figure 1:
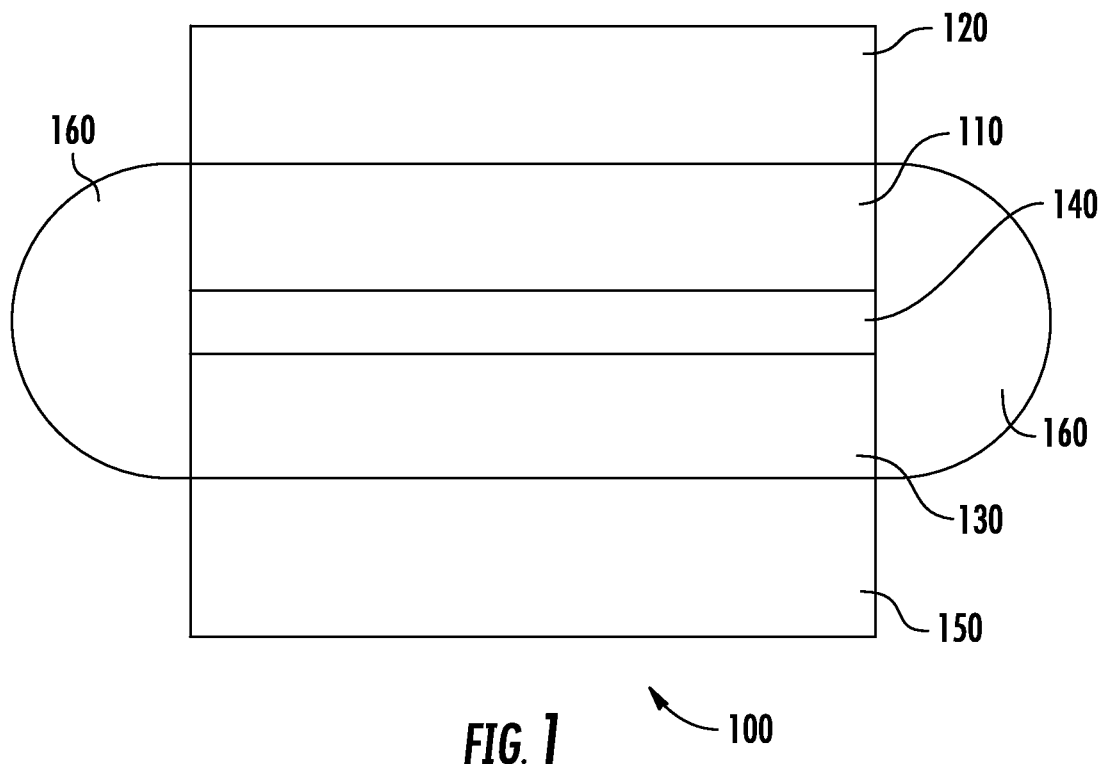
FIG. 1 shows a schematic of the disclosed composite tri-layer electrolyte structure (100).

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Stable to contact with lithium metal" or like terms or phrases refers, for example, that there is no interaction or reaction between the referenced material and lithium metal or lithium-containing alloys, which could otherwise substantially degrade the electrical, chemical, or electrochemical performance of either component.

"Stable to aqueous contact" or like terms refer, for example, there is no interaction or reaction between the referenced material and water, in liquid, solution, or vapor phase, which could otherwise substantially degrade the electrical, chemical or electrochemical performance of either component.

"A different relative chemical stability," or like terms or phrases refer, for example, to the referenced materials show different levels of interaction or reaction with respect to contact with materials of interest, including lithium metal, lithium alloys, water, water vapor, aqueous solutions, and ambient air and its components.

"LLZO," or like terms refer, for example, a solid lithium garnet composition of the formula $Li_7La_3Zr_2O_{12}$.

"LAMP," or like terms refer, for example, to a generic lithium aluminum metal phosphate electrolyte membrane structure.

"LMP" or like terms refer, for example, a LAMP specie of lithium metal phosphate electrolyte membrane compounds, for example, a LATP.

"LATP," or like terms refer, for example, a solid metal phosphate electrolyte of the formula $Li_{1.4}Al_{0.4}Ti_{1.6}(PO_4)_3$.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Certain ceramic lithium electrolytes have shown practical conductivities in excess of $10^{-4}$ S/cm (see Knauth, Solid State Ionics, (2009) 180 911-916), and there is an interest in other ceramic Li-ion electrolytes that can enable high energy cell structures. The new designs rely on the ceramic electrolyte to separate incompatible anode and cathode chemistries through hermetic isolation. For example a cell incorporating a Li-metal anode, which reacts water, and a $LiFePO_4$ cathode which includes an aqueous phase liquid electrolyte has been suggested (see Hou, et. al., Journal of Materials Chemistry A, (2013) 1 14713-14718) to overcome performance issues with traditional non-aqueous electrolytes to improve cycle life and energy density. In another example, a new approach to lithium-sulfur cell chemistry combines an aqueous sulfur cathode with a lithium metal anode (see Visco, et al., U.S. Pat. No. 8,828,574). The ceramic electrolyte in the lithium-sulfur cell must be stable against both the lithium metal and the aqueous liquid electrolyte incorporated in the sulfur cathode. These are difficult requirements to satisfy because the ceramic electrolyte must be: stable against lithium metal, aqueous stable, hermetic, and have sufficient lithium conductance for acceptable cell performance.

U.S. Pat. No. 8,828,580, to Visco, et al., entitled "Lithium battery having a protected lithium electrode and an ionic liquid catholyte," mentions an active metal and active metal intercalation electrode structures and battery cells having ionically conductive protective architecture including an active metal (e.g., lithium) conductive impervious layer separated from the electrode (anode) by a porous separator impregnated with a non-aqueous electrolyte (anolyte). This protective architecture prevents the active metal from deleterious reaction with the environment on the other (cathode) side of the impervious layer, which may include aqueous or non-aqueous liquid electrolytes (catholytes) and/or a variety of electrochemically active materials, including liquid, solid and gaseous oxidizers. Safety additives and designs that facilitate manufacture are also provided.

Accordingly, a solid electrolyte which can hermetically isolate an aqueous liquid at one interface and control contact with lithium metal at another interface is desirable. Currently, there is no single material that can satisfy these attributes. There are, however, ceramic electrolytes that can meet either the water stability or lithium metal contact attributes, but not both attributes. For example, lithium metal phosphate electrolytes such as $Li_{1.4}Al_{0.4}Ti_{1.6}(PO_4)_3$ ("LATP") have demonstrated excellent water stability (see Katoh, et. al., Journal Power Sources, (2011) 196 6877-6880). Unfortunately, such phosphates severely react with lithium metal (see Hartmann, et. al., Journal of Physical Chemistry C, (2013) 117, 21064-21074). Garnet-phase electrolytes, such as $Li_7La_3Zr_2O_{12}$ (LLZO) are known to be stable versus lithium metal (see Weppner, et. al., U.S. Pat. No. 7,901,658). However, garnet compositions having a high lithium conductivity react with water (see Jin, et. al., Journal Power Sources, (2013) 239 326-331, and Galven, et. al., Chemistry Materials, (2012) 24, 3335-3345).

There have been attempts to create a composite electrolyte comprising a phosphate chemistry combined with a garnet chemistry. Reinacher, et. al., have reported fabrication of a thin coating of $Li_6BaLa_2Ta_2O_{12}$ by pulsed laser deposition on a phosphate electrolyte as a protective layer (see Solid State Ionics, (2014) 258, 1-7). Unfortunately, the conductivity of about $10^{-6}$ S/cm of the deposited film is quite low. In general, thin film coatings are not likely to be practical due to high cost and difficulty of avoiding through-film defects, which are potential sources of failure.

In embodiments, the disclosure provides a solution to the problem of producing a composite structure having stability against lithium on the anode side and stability against an aqueous phase on the cathode side, for example, in an energy storage device.

In embodiments, the disclosure provides a composite electrolyte structure that incorporates two ceramic layers and an interposed organic-based electrolyte.

In embodiments, the disclosure provides a composite electrolyte structure comprising three layers or a tri-layer structure, including:

a first layer comprising a first ceramic electrolyte, for example, a garnet composition such as LLZO, which first electrolyte is stable against contact with lithium metal;

a second layer comprising a second ceramic electrolyte, for example, a phosphate material such as LATP, which second electrolyte is stable against aqueous contact; and a third layer comprising a third non-aqueous electrolyte, for example, a liquid or gel, electrolyte or a polymer electrolyte, interposed between the first layer and second layer, i.e., the two ceramic layers, wherein the first electrolyte, the second electrolyte, and the third electrolyte each have a different relative chemical stability, i.e., instability when compared to each other. Specifically, the anode-facing first electrolyte layer is stable under chemically or electrochemically reducing conditions including about 0 to 1 V versus Li metal. The cathode-facing second electrolyte layer is stable under chemically or electrochemically oxidizing conditions including above 2.5 V versus Li metal. In embodiments, the first layer can be, for example, a solid lithium garnet composition.

In embodiments, the second layer can be, for example, a solid metal phosphate electrolyte.

In embodiments, the third layer can be, for example, selected from at least one physical state of: a liquid, a gel, a solid polymer, or a combination thereof, and the third layer is mixture of an inorganic electrolyte salt and organic solvent.

In embodiments, the solid lithium garnet phase composition can be, for example, of the formula $Li_xA_yB_zO_{12+d}$ where x is greater than or equal to 3, A is a cation selected from at least one of a monovalent cation, a divalent cation, a trivalent cation, a tetravalent cation, or a mixture thereof, B is a cation selected from at least one of a tetravalent cation, a pentavalent cation, a hexavalent cation, or a mixture thereof, and x is greater than 2, y is greater than 2, z is greater than 1, and d is greater than −1 and less than +1, i.e., −1<d<1.

In embodiments, the solid metal phosphate electrolyte can be, for example, of the formula $Li_xM_y(PO_4)_z$, where M is an element selected from at least one of a univalent, a divalent, a trivalent, a tetravalent, a pentavalent, a hexavalent, or a mixture of elements thereof, and x is greater than 0.1, y is greater than 1, and z is greater than 2, and the metal phosphate has a NASICON structure; and In embodiments, the third layer can be, for example, a liquid electrolyte selected from at least one of: an ionic liquid, a mixture of an inorganic lithium salt and an organic solvent, or a mixture thereof.

Useful solid lithium metal phosphate electrolytes comprise formulations including for example, compounds of the formula $Li_xM_y(PO_4)_z$, and the compounds possess a crystal symmetry of the well-known NASICON structure type. The NASICON structure is named after the Na—Zr—Si phosphates having high $Na^+$ conductivity. The useful lithium metal phosphates of the disclosure can also adopt an analogous NASICON structure.

In embodiments, the solid lithium garnet composition can be, for example, $Li_7La_3Zr_2O_{12}$ (LLZO); the solid metal phosphate electrolyte can be, for example, $Li_{1.4}Al_{0.4}Ti_{1.6}(PO_4)_3$(LATP); and the third layer mixture of an inorganic electrolyte salt and organic solvent can be, for example, $LiPF_6$ in, for example, an organic solvent such as a mixture of ethylene carbonate and dimethyl carbonate.

In embodiments, the third layer mixture of an inorganic electrolyte salt and organic solvent can be, for example, $LiPF_6$ in an amount of from 1 to 30 wt %, and the organic solvent can be, for example, in an amount of from 70 to 99 wt %.

In embodiments, the tri-layer structure isolates the third layer electrolyte from contact with an aqueous phase.

In embodiments, the disclosed composite electrolyte structure can further comprise, for example:

a seal encompassing, i.e., covering or enclosing, the edges of the tri-layer structure;

a lithium metal layer adjacent to the first ceramic electrolyte, wherein the lithium metal layer is either in direct physical contact with the first ceramic electrolyte or in electrical communication with the first ceramic electrolyte; and a layer containing an aqueous electrolyte, i.e., catholyte, adjacent to and in contact with the second ceramic electrolyte.

In embodiments, the seal can be, for example, a water insoluble polymer, such as a thermally stable epoxy. The seal composition is preferably selected to be stable with respect to all contacted elements, including the organic electrolyte and the aqueous catholyte.

In embodiments, the sealed structure hermetically isolates the aqueous electrolyte containing layer, i.e., catholyte, and prevents contact of the aqueous electrolyte with the lithium metal layer.

In embodiments, the first layer can be, for example, flat and have an average thickness of from 1 to 50 microns, and from 1 to 20 microns, including intermediate values and ranges; the second layer can be, for example, flat and have an average thickness of from 1 to 50 microns, and from 1 to 20 microns, including intermediate values and ranges; and the third layer can have, for example, an average thickness of from 0.1 to 50 microns, and from 1 to 20 microns, including intermediate values and ranges.

Referring to the Figures, FIG. 1 shows a schematic of one example of the disclosed composite electrolyte structure (100). A thin (e.g., 1 to 50 microns) tape cast Li-stable garnet layer (110) can be laminated to a tape cast water-stable phosphate layer. The garnet layer contacts the lithium metal anode (120) while a tape cast LATP layer (130) (e.g., 1 to 50 microns) contacts an aqueous electrolyte component of the cathode (150). More specifically, the cathode (150) contains a solid phase and a liquid electrolyte phase. The liquid electrolyte phase is an aqueous electrolyte containing a dissolved lithium salt. The cathode liquid electrolyte phase is referred to as a catholyte. The thin ceramic layers (110) and (130) are joined by a thin (e.g., 0.1 to 30 microns) non-aqueous liquid electrolyte layer (140). An edge seal (160) provides containment and protection of the organic electrolyte (170) (liquid, gel or polymer). Optionally, the lithium metal anode (120) can include a non-aqueous liquid or polymer electrolyte (not shown) disposed between the lithium metal and the garnet layer (110). A lithium metal anode is subject to dendrite growth during charge/discharge cycling of the cell (see for example, Xu, et. al., Energy & Environmental Science (2014) 7 513-537). With either a liquid or polymer electrolyte, interlayer contact between the lithium metal anode (120) and the garnet layer (110) is assured.

Figure 2:
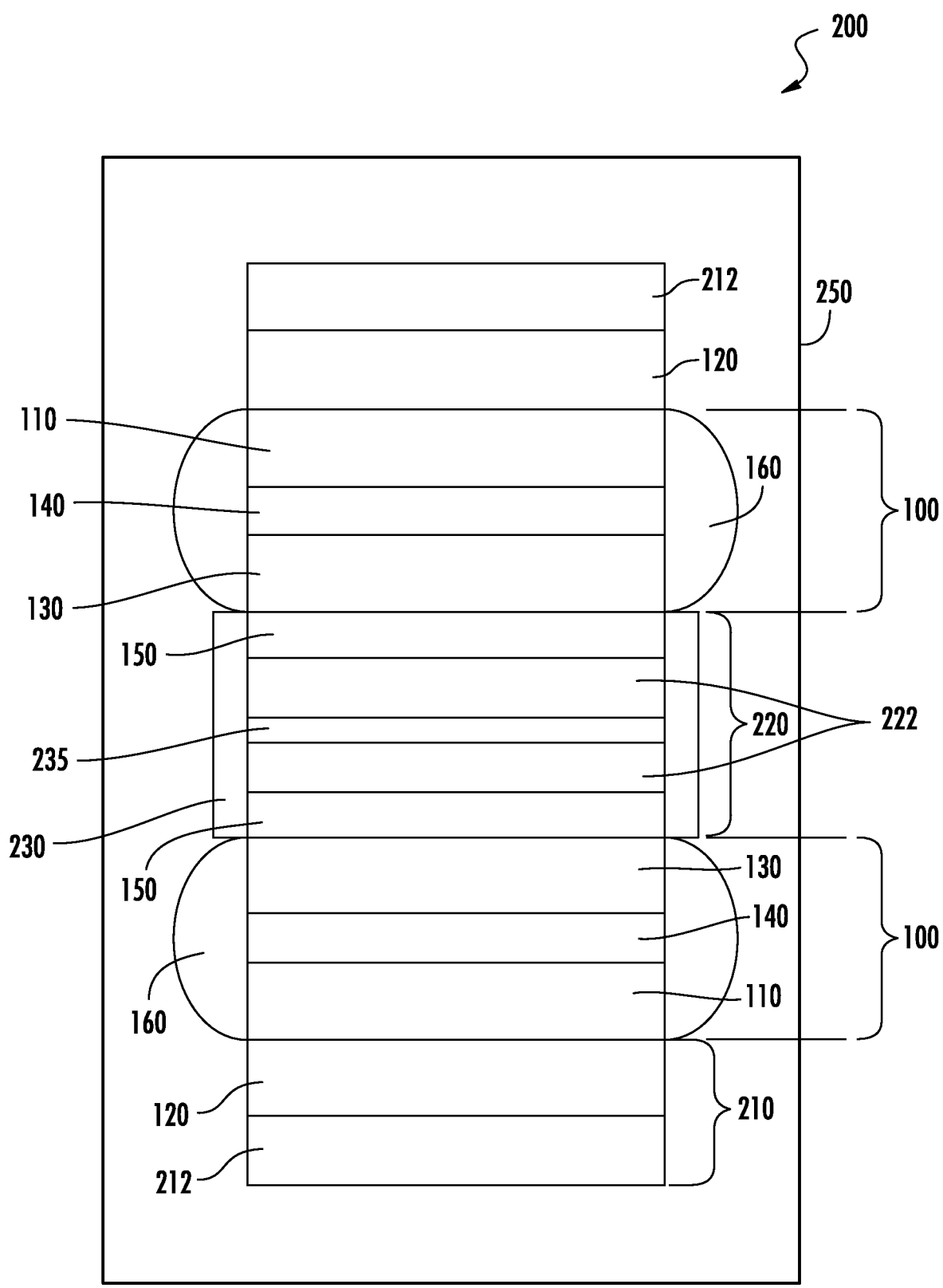
FIG. 2 shows a schematic of one implementation of a compound cell structure (200) incorporating two of the tri-layer electrolyte structures (100) of FIG. 1.

The structure of FIG. 1 can be integrated, for example, into a Li-aqueous cathode cell such that the anode and cathode structures are hermetically separated. One such structure is shown in FIG. 2. Schematically, the anode and the cathode are hermetically sealed by providing containment internal to the cell. For example, the aqueous cathode can be contained by providing a plastic or metal container which can be sealed to the trilayer structure. Sealing the cell components and tri-layer can be accomplished either separately or concomitantly during cell construction. Separate external containment can be provided to the entire cell, which serves to protect the air-sensitive Li metal anode from external ambient conditions, such as water, $CO_2$, oxygen, etc.

Suitable cathode layer (222) materials can include, for example, any water stable cathode material with aqueous catholyte, for example, sulfur with aqueous polysulfides, metal oxides such as $LiMn_2O_4$ or $LiFePO_4$, or compatible mixtures thereof, with a catholyte comprising an aqueous lithium salt solution such as $Li_2SO_4$, or compatible mixtures thereof.

FIG. 2 shows a compound cell structure (200) incorporating two of the tri-layer electrolyte structures (100) of FIG. 1. The components of the compound cell structure (200) are listed in the order of from the bottom to the top of FIG. 2. The structure shown can be repeated to form any number of stacked cells by joining two lithium metal layers (120) on either side of the anode current collector (212) and repeating the construction shown. As there is no electrically common electrolyte, the individual cells may be connected in series or parallel as desired according to how the individual electrical contact tabs are joined. In a series connection example, an insulating layer, such as a plastic film, can be interposed between adjacent lithium layers to enable cell to cell isolation.

In embodiments, the at least two tri-layer structures can comprise, for example, a structure having adjacent layers ordered according to:

a first anode (210) including a first lithium metal anode (120) bonded to a first anode current collector (212);

a first tri-layer electrolyte structure (100) including a first solid lithium garnet composition (110) in contact with the first lithium metal anode (120), a first non-aqueous electrolyte layer (140), a first LMP layer (130), and first edge seal (160);

a first cathode structure (220) including:
a first aqueous catholyte (150) in contact with the first LMP layer (130) and a first porous solid cathode layer (222);
a second aqueous catholyte (150) in contact with a second LMP layer (130) and a second porous solid cathode layer (222);
a cathode current collector (235) disposed between the first aqueous catholyte (150) and the second aqueous catholyte (150); and
an internal containment member (230), which isolates the first cathode structure (220) from the environment within the composite electrolyte structure;

a second trilayer electrolyte structure (100) including a second LMP layer (130) in contact with the second aqueous catholyte (150), a second non-aqueous electrolyte layer (140), a second solid lithium garnet composition (110), and second edge seal (160);

a second anode (210) including a second lithium metal anode (120) in contact with the second solid lithium garnet composition (110) and bonded to a second anode current collector (212); and an external container (250).

In embodiments, the aqueous catholyte (150) can permeate the porous solid cathode layer (222) to contact the cathode current collector (235).

In embodiments, the above composite electrolyte structure can further comprise, for example, a seal member for each tri-layer structure, and an internal containment structure for each cathode structure.

In embodiments, the above composite electrolyte structure can further comprise, for example, a container or an external containment structure.

In embodiments, the disclosure provides a method of making the disclosed composite tri-layer electrolyte structure, comprising:

tape casting and sintering the first ceramic electrolyte;
tape casting and sintering the second ceramic electrolyte; and
disposing, e.g., interposing, the third layer comprising a third non-ceramic electrolyte between the first and second ceramic electrolytes, to form the composite tri-layer electrolyte structure.

In embodiments, the disposing can be accomplished, for example, with vacuum or pressure to remove entrapped gas bubbles from the third electrolyte.

In embodiments, the disclosed method of making can further comprise, for example, sealing the edges of the tri-layer structure with a non-conductive substance, such as an epoxy or like polymer.

In embodiments, the disclosed method of making can further comprise, for example:
attaching a lithium metal layer adjacent to and in contact with the first ceramic electrolyte and separated from the third non-ceramic electrolyte; and
contacting an aqueous electrolyte containing layer, i.e., catholyte, adjacent to the second ceramic electrolyte and separated from the third non-ceramic electrolyte.

In embodiments, the disclosed method of making can further comprise, for example: combining two or more composite tri-layer electrolyte structures.

In embodiments, the disclosure provides a lithium-ion battery comprising:
internal components comprising and situated in the order listed:
an anode comprising lithium metal;
a ceramic electrolyte adjacent to the anode;
a cathode comprising an aqueous catholyte adjacent to the ceramic electrolyte, wherein the cathode includes an interior seal that contains the aqueous catholyte and isolates the aqueous catholyte from the anode; and
a container that contains and isolates the internal components from the external atmosphere.

In embodiments, the disclosure provides a lithium-ion battery comprising:
internal components comprising, in the order listed:
an anode comprising lithium metal;
a first ceramic electrolyte adjacent to the anode;
a non-aqueous electrolyte adjacent to the first ceramic electrolyte;
a second ceramic electrolyte adjacent to the non-aqueous electrolyte;
a cathode comprising an aqueous catholyte adjacent to the second ceramic electrolyte, wherein the cathode includes an interior seal that contains the aqueous catholyte and isolates the aqueous catholyte from the anode; and
a container that contains and isolates the internal components from the external atmosphere.

In embodiments, the disclosed composite electrolyte structure further isolates the third layer electrolyte from contact with an aqueous phase, for example, with an internal seal or closure such as an epoxy bead.

In embodiments, the interposed third layer comprising a non-aqueous liquid electrolyte or a polymer electrolyte can be sealed between the two ceramic layers forming a sealed tri-layer composite structure. Preferably, the first ceramic layer and second ceramic layer are very thin to maximize conductance, and having a thickness, for example, of from 10 to 200 microns, preferably less than 100 microns such as from 10 to 100 microns, and more preferably about 20 microns or less such as from 5 to 15 microns. These specified thin ceramic layers can be made by, for example, tape casting, and like methods and variants. The third layer comprising the non-aqueous electrolyte can be, for example, a liquid, a gel, or a polymer. The third layer can also be thin, having a thickness of, for example, from 0.1 to 50 microns, and preferably less than 20 microns such as from 0.1 to 15 microns.

In embodiments, the sealed structure having the above-mentioned three layer structure ("tri-layer") can be provided, or alternatively, the first and second layers (ceramic layers) can be provided, and the tri-layer structure can be formed during cell fabrication.

FIG. 2 shows a cell having two tri-layer electrolyte laminate structures (100) where the orientation of adjacent tri-layer structures (100) are inverted or flipped to permit sequential anode/cathode/anode stacking. While this example shows internal containment of the aqueous cathode, the internal containment of the anode, or both anode and cathode, can be optional. Internal containment of the cathode may be preferred as the cathode layers will undergo less expansion/contraction on cycling compared to the lithium metal anode.

The present disclosure is advantaged is several aspects, including for example:

Elimination of critical defects: Since the first and second ceramic layers can be made separately, they can be individually inspected for defects, ensuring the integrity of each ceramic layer.

Low interfacial impedance: It is known that liquid/solid interfaces typically show low interfacial impedance and aggressive conditions are typically not necessary during device construction. In contrast, solid/solid interface resistances are often very large (see for example, Jin, et. al., Electrochimica Acta, 89, 407-412) due to, for example, elevated temperature processing.

Materials of construction: Fewer compatibility issues and a wide range of materials of construction are available for the disclosed composite electrolyte structure. Since high temperature fabrication of the ceramic layer elements can be accomplished separately, there is little, if any, concern regarding deleterious reaction among the component layers.

EXAMPLES

The following Example(s) demonstrate making, use, and analysis of the disclosed phosphate-garnet solid electrolyte structure and articles thereof in accordance with the above description and general procedures.

Example 1 (Prophetic)

Preparation of the Phosphate-Garnet Solid Electrolyte Structure of FIG. 1

A thin, hermetic ceramic electrolyte comprising a lithium-stable garnet composition, such as $Li_7La_3Zr_2O_{12}$, measuring 40 microns thick and 2.5 cm×2.5 cm in length and width is provided. Such a membrane can be made by a variety of ceramic processing techniques, such as tape casting and sintering, or by cutting and polishing sliced layers to the required thickness and laser cutting to a final dimension. Great care must be taken to handle such thin ceramics as they are fragile.

Likewise a thin, hermetic ceramic electrolyte comprising a water-stable LMP composition such as $Li_{1.4}Al_{0.4}Ti_{1.6}(PO_4)_3$ (LATP) is provided. Construction of the laminate is performed in an atmosphere-controlled environment, such as an argon-filled glove box. One of the ceramic electrolytes is placed on a non-wetting surface, such as a Teflon® surface.

Next a non-aqueous liquid electrolyte is prepared. Preferably, the liquid electrolyte should have a sufficiently low vapor pressure to allow for sufficient working time during the lamination operation. 1M $LiPF_6$ is dissolved in 1:1 by volume ethylene carbonate (EC): dimethyl carbonate (DMC). A few drops of the liquid electrolyte are placed on the ceramic membranes residing on the non-wetting surface. The second ceramic membrane is then gently placed over the liquid. The electrolyte wets the ceramic, causing excess liquid to egress. By gently pressing, trapped bubbles can be removed and the two ceramic layers may be perfectly aligned such that there edges are flush. Excess liquid is wiped away. At this point the laminated structure may be handled with care to prevent the ceramic layers from slipping. A sealing material which is non-reactive against the non-aqueous liquid electrolyte is applied, for example, a fast-curing two-part epoxy, such as Loctite® Quickset, can be used.

The laminate can then be sealed by contacting all edges of the structure with the liquid epoxy, taking care that the edges of both ceramic layers contact the epoxy. In this way an epoxy seal (160) is formed. The sealed structure is placed on the non-wetting surface to cure.

After fabrication, the laminated structure is much easier to handle without concern for fracture compared to the starting ceramic layers.

Example 2 (Prophetic)

Preparation of the Composite Article of FIG. 2 Incorporating the Phosphate-Garnet Solid Electrolyte Structure of FIG. 1

In this example a $LiMn_2O_4$ cathode with aqueous catholyte is coupled with a Li metal anode. Two tri-layer electrolyte structures of Example 1 are prepared. A $LiMn_2O_4$ cathode is prepared by mixing $LiMn_2O_4$ powder, carbon black, and PVDF binder in a weight ratio of 80:10:10. N-methyl pyrrolidone (NMP) is added to the mixture in sufficient quantity to make a castable paste. The paste is cast on both sides of a 316 stainless steel (SS) foil and dried at 100° C. The cathode is cut to be slightly undersized compared to the tri-layer electrolyte structure. A one quarter inch wide 316 SS contact tab is spot welded onto the cathode foil. A 1 M $Li_2SO_4$ catholyte solution is prepared by dissolving an appropriate amount of lithium sulfate in deionized water. The cast cathode is saturated with the lithium sulfate electrolyte by dipping in the prepared solution. The cathode layer is sandwiched between the LATP sides of the two trilayer electrolytes and pressed to ensure good contact. Excess liquid electrolyte is removed and the cathode is sealed on all four sides and around the protruding 316 SS contact tab with epoxy to complete the formation of a sealed cathode half-cell assembly.

In an Ar-filled glovebox, a lithium anode is formed by pressing a lithium foil cut to be slightly undersized compared to the tri-layer electrolyte structure and pressed into a Ni foil of the same size. The nickel foil has a pre-attached one quarter inch wide Ni contact tab. Two such pressed foils are arranged with the lithium metal foil facing the garnet layer of the two trilayer electrolytes of the sealed cathode half-cell assembly. The stack of the cathode half-cell sandwiched between lithium metal foil anodes is then pressed to provide good contact between the lithium metal foil and the garnet electrolyte. The resulting pressed cell forming the compound cell structure (200) is then sealed in an aluminized "soft pouch" package to provide the external containment (250), with cathode and anode contact tabs protruding.

Example 3 (Prophetic)

Operation and Performance of the Composite Article of FIG. 2

The cell of Example 2 can provide a voltage of approximately 3.8 V, operation at greater than 1 $mA/cm^2$ current density, and excellent stability. Cell cycling shows greater than 99.9% columbic efficiency over several hundred cycles.

The disclosure has been described with reference to various specific embodiments and techniques. However, it should be understood that many variations and modifications are possible while remaining within the scope of the disclosure.

What is claimed:

1. A composite electrolyte tri-layer structure, comprising:
   (a) a first layer comprising a first ceramic electrolyte, wherein the first layer is a solid lithium garnet composition stable to contact with lithium metal;
   (b) a second layer comprising a second ceramic electrolyte, wherein the second layer is a solid metal phosphate electrolyte stable to aqueous contact; and
   (c) a third layer comprising a third non-aqueous electrolyte interposed between and in direct contact with the first layer and second layer, wherein the third layer is selected from at least one of: a liquid, a gel, a solid polymer, or a combination thereof, and is a mixture of an inorganic electrolyte salt and organic solvent,
   wherein the first electrolyte, the second electrolyte, and the third electrolyte each have a different relative chemical stability.

2. The composite electrolyte structure of claim 1 wherein:
   the solid lithium garnet composition is of the formula $Li_xA_yB_zO_{12+d}$ where x is greater than or equal to 3, A is a cation selected from at least one of a monovalent cation, a divalent cation, a trivalent cation, a tetravalent cation, or a mixture thereof, B is a cation selected from at least one of a tetravalent cation, a pentavalent cation, a hexavalent cation, or a mixture thereof, and x is greater than 2, y is greater than 2, z is greater than 1, and d is greater than −1 and less than +1;
   the solid metal phosphate electrolyte is of the formula $Li_xM_y(PO_4)_z$, where M is an element selected from at least one of a univalent, a divalent, a trivalent, a tetravalent, a pentavalent, a hexavalent, or a mixture of elements thereof, and x is greater than 0.1, y is greater than 1, and z is greater than 2, and the metal phosphate has a NASICON structure; and
   the third layer is a liquid electrolyte selected from at least one of: an ionic liquid, a mixture of an inorganic lithium salt and an organic solvent, or a mixture thereof.

3. The composite electrolyte structure of claim 1 wherein:
   the solid lithium garnet composition is $Li_7La_3Zr_2O_{12}$;
   the solid metal phosphate electrolyte is $Li_{1.4}Al_{0.4}Ti_{1.6}(PO_4)_3$; and
   the third layer mixture of an inorganic electrolyte salt and organic solvent is $LiPF_6$ in ethylene carbonate and dimethyl carbonate.

4. The composite electrolyte structure of claim 1 wherein the third layer mixture of an inorganic electrolyte salt and organic solvent is $LiPF_6$ in an amount of from 1 to 30 wt %, and the organic solvent is in an amount of from 70 to 99 wt %.

5. The composite electrolyte structure of claim 1 wherein the tri-layer structure isolates the third layer electrolyte from contact with an aqueous phase.

6. The composite electrolyte structure of claim 1 further comprising:
a seal encompassing the edges of the tri-layer structure;
a lithium metal layer adjacent to the first ceramic electrolyte, wherein the lithium metal layer is either in direct physical contact with the first ceramic electrolyte or in electrical communication with the first ceramic electrolyte; and
a layer containing an aqueous electrolyte adjacent to and in contact with the second ceramic electrolyte.

7. The composite electrolyte structure of claim 6 wherein the seal is a water insoluble polymer.

8. The composite electrolyte structure of claim 6 wherein the structure hermetically isolates the aqueous electrolyte containing layer and prevents contact of the aqueous electrolyte with the lithium metal layer.

9. The composite electrolyte structure of claim 1 wherein:
the first layer is flat and has an average thickness of from 1 to 50 microns;
the second layer is flat and has an average thickness of from 1 to 50 microns; and
the third layer has an average thickness of from 0.1 to 50 microns.

10. The composite electrolyte tri-layer structure of claim 1 further comprising at least two tri-layer structures.

11. The composite electrolyte structure of claim 10 wherein the at least two trilayer structures comprise a structure according to:
a first anode (210) including a first lithium metal anode (120) bonded to a first anode current collector (212);
a first trilayer electrolyte structure (100) including a first solid lithium garnet composition (110) in contact with the first lithium metal anode (120), a first non-aqueous electrolyte layer (140), a first LMP layer (130), and first edge seal (160);
a first cathode structure (220) including:
a first aqueous catholyte (150) in contact with the first LMP layer (130) and a first porous solid cathode layer (222);
a second aqueous catholyte (150) in contact with a second LMP layer (130) and a second porous solid cathode layer (222);
a cathode current collector (235) disposed between the first aqueous catholyte (150) and the second aqueous catholyte (150); and
an internal containment member (230), which isolates the first cathode structure (220) from the environment within the composite electrolyte structure;
a second trilayer electrolyte structure (100) including a second LMP layer (130) in contact with the second aqueous catholyte (150), a second non-aqueous electrolyte layer (140), a second solid lithium garnet composition (110), and second edge seal (160);
a second anode (210) including a second lithium metal anode (120) in contact with the second solid lithium garnet composition (110) and bonded to a second anode current collector (212); and
an external container (250).

12. The composite electrolyte structure of claim 11 further comprising a seal member for each tri-layer structure, and an internal containment structure for each cathode structure.

13. The composite electrolyte structure of claim 11 further comprising an external containment structure.

14. A method of making a composite tri-layer electrolyte structure of claim 1, comprising:
tape casting and sintering a first ceramic electrolyte, wherein the first ceramic electrolyte is a solid lithium garnet composition stable to contact with lithium metal;
tape casting and sintering a second ceramic electrolyte, wherein the second ceramic electrolyte is a solid metal phosphate stable to aqueous contact; and
disposing a third layer comprising a third non-ceramic electrolyte between and in direct contact with the first and second ceramic electrolytes, to form the composite tri-layer electrolyte structure, wherein the third layer is selected from at least one of: a liquid, a gel, a solid polymer, or a combination thereof, and is a mixture of an inorganic electrolyte salt and organic solvent,
wherein the first ceramic electrolyte, the second ceramic electrolyte, and the third layer each have a different relative chemical stability.

15. The method of claim 14 wherein the disposing is accomplished with vacuum or pressure to remove entrapped gas bubbles from the third electrolyte.

16. The method of claim 14 further comprising sealing the edges of the tri-layer structure with a non-conductive substance.

17. The method of claim 14 further comprising:
attaching a lithium metal layer adjacent to and in contact with the first ceramic electrolyte and separated from the third non-ceramic electrolyte; and
contacting an aqueous electrolyte containing layer adjacent to the second ceramic electrolyte and separated from the third non-ceramic electrolyte.

18. The method of claim 14 further comprising combining two or more composite tri-layer electrolyte structures.

19. A lithium-ion battery comprising:
internal components comprising and structured in the order listed:
an anode comprising lithium metal;
a first ceramic electrolyte adjacent to the anode, wherein the first ceramic electrolyte is a solid lithium garnet composition stable to contact with lithium metal;
a non-aqueous electrolyte adjacent to and in direction contact with the first ceramic electrolyte, wherein the non-aqueous electrolyte is selected from at least one of: a liquid, a gel, a solid polymer, or a combination thereof, and is a mixture of an inorganic electrolyte salt and organic solvent;
a second ceramic electrolyte adjacent to and in direction contact with the non-aqueous electrolyte, wherein the second ceramic electrolyte is a solid metal phosphate electrolyte stable to aqueous contact;
a cathode comprising an aqueous catholyte adjacent to the second ceramic electrolyte, wherein the cathode includes an interior seal that contains the aqueous catholyte and isolates the aqueous catholyte from the anode; and
a container that contains and isolates the internal components from the external atmosphere; and wherein the first ceramic electrolyte, the second ceramic electrolyte, and the non-aqueous electrolyte each have a different relative chemical stability.

* * * * *

UNITED STATES PATENT AND TRADEMARK OFFICE
CERTIFICATE OF CORRECTION

PATENT NO. : 10,593,998 B2
APPLICATION NO. : 14/934315
DATED : March 17, 2020
INVENTOR(S) : Michael Edward Badding et al.

It is certified that error appears in the above-identified patent and that said Letters Patent is hereby corrected as shown below:

On the Title Page

On page 2, in Column 2, item (56), Other Publications, Line 5, delete "Jin anf McGinn," and insert -- Jin and McGinn, --, therefor.

On page 2, in Column 2, item (56), Other Publications, Line 31, delete "on" and insert -- ion --, therefor.

In the Claims

In Column 12, Line 2, Claim 14, delete "structure of claim 1," and insert -- structure, --, therefor.

In Column 12, Line 45, Claim 19, delete "direction" and insert -- direct --, therefor.

In Column 12, Lines 51-52, Claim 19, delete "direction" and insert -- direct --, therefor.

Signed and Sealed this
Twenty-sixth Day of April, 2022

Katherine Kelly Vidal
*Director of the United States Patent and Trademark Office*